United States Patent

Kuhn, deceased et al.

[15] 3,639,838

[45] Feb. 1, 1972

[54] SYNCHRONIZED VARIABLE DELAY TIME DIVISION COMMUNICATION SYSTEM

[72] Inventors: Henry G. Kuhn, deceased, late of Malibu, Calif. by Alida Kuhn, executrix; Ross Corless Winterbottom, Santa Monica, Calif.

[73] Assignee: Hughes Aircraft Company, Culver City, Calif.

[22] Filed: Jan. 30, 1968

[21] Appl. No.: 701,786

[52] U.S. Cl. ....................................325/4, 179/15, 325/15, 325/58, 343/6.5, 343/179

[51] Int. Cl. ....................................................H04b 7/20

[58] Field of Search ........................325/4, 58, 14, 15, 63, 29; 343/175, 179, 100, 100 SA, 13, 6.5 LC, 7; 179/15, 15 A; 178/69.5

[56] References Cited

UNITED STATES PATENTS

| | | | |
|---|---|---|---|
| 3,320,611 | 5/1967 | Sekimoto et al. | 343/6.5 |
| 3,351,858 | 11/1967 | Jowett et al. | 325/4 X |
| 3,378,845 | 4/1968 | Welber | 343/100 |
| 3,418,579 | 12/1968 | Hultberg | 325/4 X |
| 3,430,237 | 2/1969 | Allen | 343/7.5 |

*Primary Examiner*—Robert L. Griffin
*Assistant Examiner*—Benedict V. Safourek
*Attorney*—James K. Haskell and Noel B. Hammond

[57] ABSTRACT

A locally-generated reference sync signal and the master sync signal received from the repeater are compared in time of occurrence to develop an error signal which varies the frequency of a controllable oscillator to synchronize the reference sync signal to the master sync signal. A counter and timing matrix in the master sync loop controls the generation of own-sync reference signals during the station's time slot. The own-sync reference signals are compared in time of occurrence with the own-sync signals as received via the repeater to develop an error signal which varies the phase of a continuously variable phase shifter to synchronize the own-sync generator to the own-sync reference signals. In another embodiment, the range to the repeater obtained by means of a ranging signal is compared with the time difference between the output of the counter and timing matrix in the master sync loop, and the output of the transmit counter and timing matrix. The resultant error signal varies the phase of the continuously variable phase shifter to correct the timing of the transmit control circuits.

4 Claims, 5 Drawing Figures

PATENTED FEB 1 1972 3,639,838

INVENTORS,
ROSS C. WINTERBOTTOM,
HENRY G. KUHN, DECEASED,
BY ALIDA KUHN, EXECUTRIX,
BY Noel B. Hammond
AGENT.

SYNCHRONIZED VARIABLE DELAY TIME DIVISION COMMUNICATION SYSTEM

This invention relates to communication systems, and more particularly to a time division multiplex communication system wherein a plurality of stations are served by a common repeater, and wherein there is relative motion between the stations and the repeater.

In a system using a common repeater, all transmissions from all stations are received at and retransmitted by the repeater. Any desired transmission scheme may be employed. For time division multiplexing, each of the stations transmits on the same channel frequency, but in different time slots, so that the various transmissions arrive at the repeater in a preselected order, i.e., with no overlap. The repeater then retransmits such signals in the order in which they were received.

In time division multiplex systems as heretofore known, there is no means to compensate for relative motion between the several stations and their common repeater and for transit time variations of the several signals that would result in time overlap of transmissions arriving at the repeater. To better understand the problems to be dealt with, assume an instant where two stations are equally spaced from the repeater. Also, assume the order that one station starts transmitting at a given instant, and transmits for a given period, at the end of which the second station immediately transmits for a similar interval. Further, the stations are to transmit alternately.

Now assume that at the start of the next succeeding transmission cycle, the repeater is in a position where it is closer to the second station. In such case, it takes longer for a transmission from the first station to reach the repeater. Therefore, the first part of the transmission from the second station reaches the repeater during the last part of the transmission from the first station. Thus, there is an overlap of portions of the transmissions from the two stations, i.e., the second station is effectively a jamming station for the first. To avoid this circumstance, the first station would have had to advance its transmission, and the second station would have had to delay its transmission, enough to avoid the overlap.

Such problems are multiplied manyfold where the number of stations is large, and where each station is to transmit in a plurality of time slots for extremely short periods of time. In this latter connection, it may be desired to have each station transmit for a period of less than one thousandth of a second, and to transmit a number of times each second. Under such circumstances, movement of the repeater between or during transmissions may cause transmissions from a number of stations to arrive at the repeater simultaneously, and thereby result in a plurality of unintelligible jamming signals being retransmitted by the repeater.

No time division multiplexing system heretofore known has been provided in which to avoid jamming signals caused by relative movement of the repeater between or during transmissions. It is, therefore, a primary object of this invention to provide a variable delay time division multiplexing communication system in which transmissions from various stations are synchronized so that they do not arrive at the repeater simultaneously.

It is another object of this invention to provide a variable delay communication system having unique time division synchronizing means.

It is also an object of this invention to provide means for controlling the operations of stations in a time division multiplexing system with a minimum number of component parts and of simple design.

The above and other objects and advantages of this invention will become apparent from the following description taken in conjunction with the accompanying drawings of illustrative embodiments thereof, in which.

Preparatory to describing the figures, it should be pointed out that all times are referenced to the portion of the system that is common to all stations, i.e., the repeater. As will become evident, this basis holds whether the repeater is stationary and the stations are moving, whether the repeater is moving and the stations are fixed, or whether the repeater and the stations are all moving.

Figure 1:
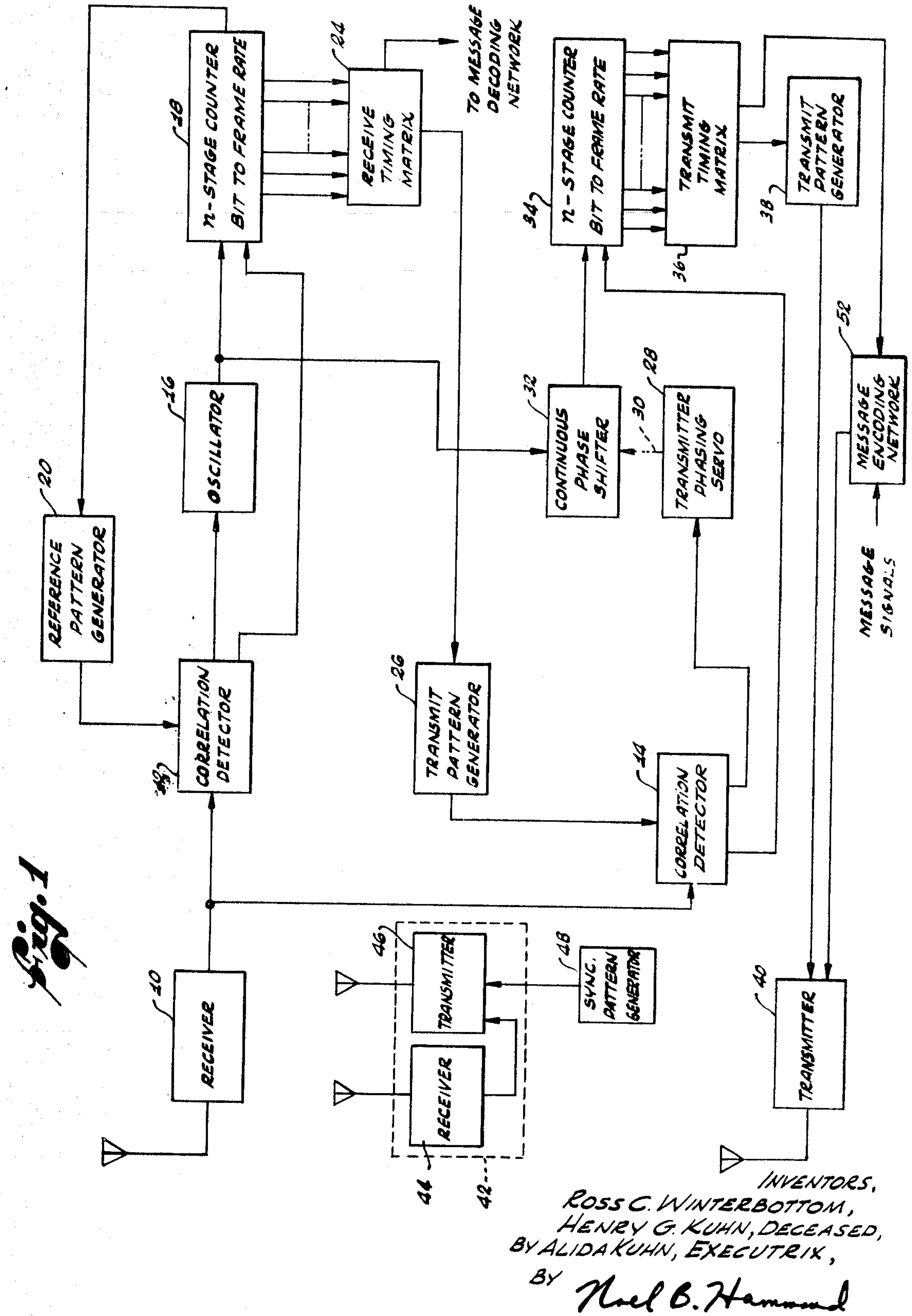
FIG. 1 is a block diagram of a system at a station in a time division multiplexing communication system, wherein synchronizing signals from a repeater are utilized to advance or retard transmissions in accordance with changes in position of the repeater, thereby to cause transmissions to arrive at the repeater in a predetermined order, and without overlap.

Referring to FIG. 1, a receiver 10 processes signals from a repeater and applies detected RF signals to correlation detectors 12, 14. The correlation detector 12 is coupled to an oscillator 16, which is a variable frequency oscillator, e.g., a voltage-controlled crystal oscillator. The output of the oscillator 16 is coupled to a multistage counter 18 which has an output connection to a reference pattern generator 20 that is coupled to the correlation detector 12.

The correlation detector 12 is adapted to compare the outputs of the receiver 10 and reference pattern generator 20, and to alter the frequency of operation of the oscillator 16 as is necessary until the pattern signal from the generator 20 coincides in time with that of the receiver 10. In this connection, the counter 18 responds to the output of the oscillator 16 to cause the output of the generator 20 to shift in phase until the output of the correlation detector 12 is in time coincidence with the similar synchronizing signal received via the receiver 10. Additionally, signals derived from the correlation detector 12 may be coupled directly into the counter 18 to enhance the rate at which the desired synchronization is attained.

A receive timing matrix 24 is coupled to the counter 18, and a transmit pattern generator 26 is connected between the matrix 24 and the correlation detector 14. The correlation detector 14 has an output connection to a transmit phasing servo 28 which, as indicated at 30, is adapted to control a continuous phase shifter 32 through which the oscillator 16 is coupled to a multistage counter 34. The counter 34 is similar to the counter 18 previously mentioned, and is coupled to a transmit timing matrix 36 similar to the receive timing matrix 24. A transmit pattern generator 38, similar to the generator 26 previously mentioned, is connected between the matrix 36 and a transmitter 40.

The correlation detector 14 operates in a manner similar to that of the correlation detector 12, in that it compares a received signal with the output of the pattern generator 26, and applies to the transmitter phase servo 28 a signal that corresponds to the phase difference between the compared pattern signals. Accordingly, the servo 28 operates the phase shifter 32 to cause the output of the oscillator 16 applied thereto to be changed until the pattern signal of the patter generator 38 radiated by the transmitter 40, and received back at the correlation detector 14, coincides with the output of the pattern generator 26.

In this latter connection, the counter 34 and matrix 36 respond to the output of the phase shifter 33 to time the output of the pattern generator 38 to the degree necessary to cause the signal radiated by the transmitter 40 and received back at the receiver 10 and correlation detector 14, to establish the necessary coincidence of pattern signals at the correlation detector 14. Thereupon, the output of the correlation detector 14 moves to a level to prevent further change of the phase servo 28. Accordingly, until the input to the correlation detector 14 from the receiver 10 is out of phase with that from the generator 26, the output of the phase shifter 32 remains constant, as does the output of the pattern generator 38.

As in the case of the correlation detector 12 and counter 18, signals derived from the correlation detector 14 may be coupled directly into the counter 34 to enhance the rate at which the desired synchronization is attained.

To aid in explaining the operation of the system of FIG. 1, there is also shown a repeater 42 comprising a receiver 44 and transmitter 46. Signals from each transmitter 40 in the system are received at the receiver 44, and coupled to the transmitter 46 for retransmission to each receiver 10 in the system. Additionally, the transmitter 46 is adapted to periodically transmit a synchronizing burst or pattern signal, the source of which in the particular illustration is a synchronizing pattern generator 48 coupled to the transmitter 46. The pattern generator 48 may be a source within the repeater 42, in which case it is timed to modulate the transmitter at fixed intervals to effect the transmission of the desired synchronizing pattern thereby. Alternatively, the generator 48 may be located remotely from the repeater 42, e.g., as at a separate master or control station, in which case the synchronizing burst is transmitted to the receiver 44, and thence coupled to the transmitter 46 for transmission to the receiver 10.

In accordance with the invention, frame synchronizing bursts are transmitted from the repeater 42 to all stations. Each such synchronizing burst marks the beginning of a frame, during which each of the stations in the system transmits a synchronizing burst of its own. In this connection, and referring to FIG. 3, there is illustrated a time scale representation in which a mark "R" represents the initiation of the frame synchronizing burst from the repeater, and marks "A"–"L" represent the spaced synchronizing bursts from each of the stations A–L as they arrive at the repeater.

Figure 4:
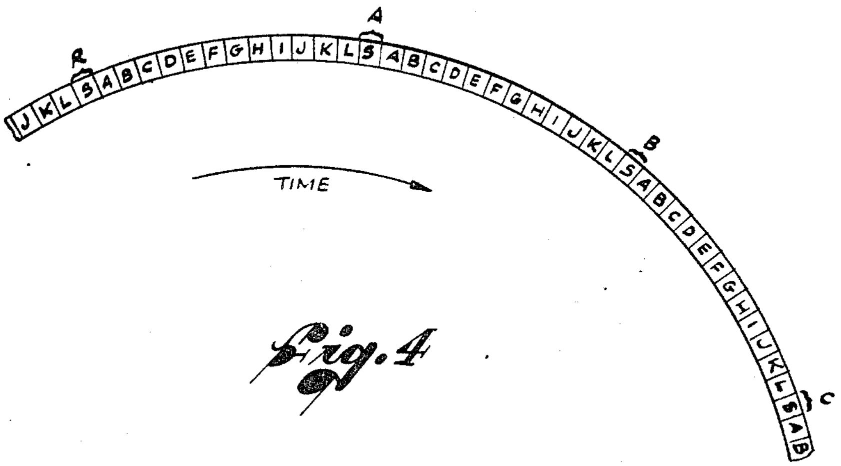
FIG. 4 is a fragmentary, enlarged portion of the representation of FIG. 3.

Referring to FIG. 4, each of the stations A–L is allotted a number of sequential or randomly disposed time slots for transmission. As illustrated in FIG. 4, repetitive time slot sequences A–L are separated by time slots S which represent the synchronizing bursts above mentioned. In this illustration, the time intervals for the synchronizing bursts S and for the discrete transmission periods A–L are of the same duration. Thus, the frame synchronizing bursts S of the repeater marks the beginning of a frame and each of the stations A–L transmits its synchronizing burst S once during each frame in this illustration. Further, each of the stations in this illustration is allotted a total of 12 time slots for transmission.

To illustrate the problems previously mentioned in connection with transmissions which arrive at the repeater simultaneously, let it be assumed that a time slot is of the order of 0.001 second duration. Also, the stations are to transmit so that their signals arrive at the repeater in the order shown. Further, let it be assumed that, as indicated in FIG. 4, there is to be an absolute minimal delay between successive transmissions arriving at the repeater. Under such circumstances, it will be appreciated that any significant movement of the repeater relative to the various stations A–L would ordinarily result in a plurality of jamming signals arriving at the repeater.

Figure 2:
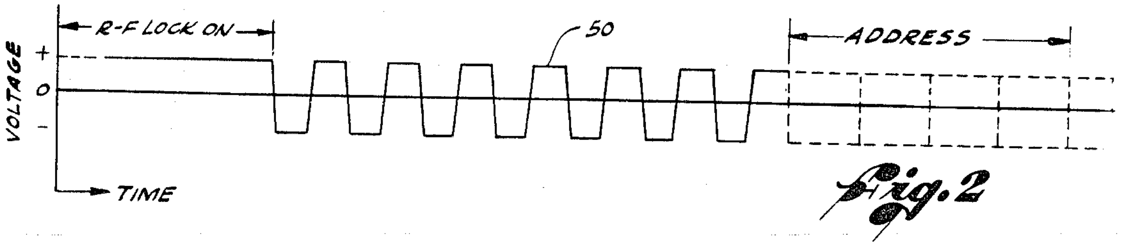
FIG. 2 is a graph of the waveform of a synchronizing signal for use in explaining the operation of the system of FIG. 1.

Synchronizing bursts as previously described are utilized to time the transmissions from the various stations so that their signals arrive at the repeater in the preselected order. In this connection, each station is adapted to transmit a synchronizing burst that is identifiable with the station from which it was transmitted. Referring to FIG. 2, there is illustrated a synchronizing burst message which includes a cyclical signal 50 followed by an address interval. The signal 50 may be the same signal transmitted from the repeater and from each of the stations. However, the address portion of each synchronizing burst is peculiar to the station from which it was transmitted. Thus, the address portion of the synchronizing burst from the repeater 42 contains digital information which identifies the repeater. Similarly, the address portion of a signal from station A contains digital information which identifies station A; the address portion of the synchronizing burst from station B contains digital information identifying station B; etc.

Figure 3:
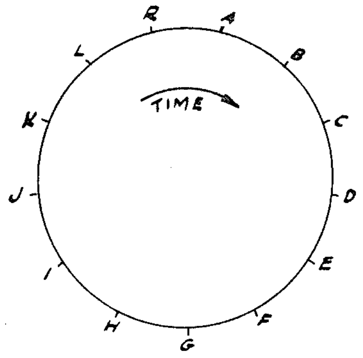
FIG. 3 is a representation of a frame of transmissions from a number of stations in a preselected order, the start of each frame being signaled by a synchronizing burst from the repeater.

Again referring to FIG. 1 along with FIGS. 2–4, the reference pattern generator 20 at each station provides a synchronizing burst which is identical to that radiated from the transmitter 46 of the repeater. Thus, the output of the pattern generator 20 includes the same address as in the master synchronizing burst transmitted from the repeater. Also, the two transmit pattern generators 26, 38 develop identical "own-station" synchronizing burst signals, i.e., each having the address portion of the particular station. Thus, for station A, the address portions of the synchronizing bursts from both of the generators 26, 38 contain digital information which identifies station A.

With the foregoing in mind, the master synchronizing burst from the repeater arrives at the receiver 10 and is applied to the correlation detector 12 along with the output of the pattern generator 20. As previously mentioned, these signals are identical. If they coincide in time, the output of the correlation detector 12 is such that it does not change the frequency of operation of the oscillator 16. However, if the signal in the output of the generator 20 is not coincident with that from the receiver 10, the detector 12 develops an output which modifies the frequency of the oscillator 16 and thence, in time, the phasing of the counter 18 output to pulse the pattern generator 20, and thereby cause the signal therefrom to be advanced or retarded as necessary to bring it into time coincidence with the signal from the receiver 10.

As will now be apparent, the transmit pattern generator 38 is adapted to modulate the transmitter 40 and cause the "own-station" synchronizing burst to be transmitted to the repeater. Such signal is retransmitted by the repeater and is fed through the receiver 10 to the correlation detector 14. Inasmuch as the output of the transmit pattern generator 26 is identical to that of the transmit pattern generator 38, the correlation detector 14 develops an output which represents the degree to which the received signal associated with the generator 38 is out of step with that from the pattern generator 26. Accordingly, the correlation detector 14 controls the operation of the transmit phasing servo 28, and hence the signal applied through the continuous phase shifter 32 to the counter 34, to control the transmit pattern generator 38 so that its output is advanced or retarded to the extent required to establish time coincidence at the correlation detector 14 of the signals from the pattern generators 26, 38.

To better understand the system operation, assume a sudden displacement of the repeater and/or stations in such direction as to reduce the distance separating them. A previously transmitted "own-station" synchronizing burst would arrive at the repeater earlier than scheduled relative to the frame synchronizing burst at the repeater. The two synchronizing bursts would be transmitted to all receivers 10 and be applied to the correlation detectors 12, 14.

Due to the reduced transit time, the frame synchronizing burst would arrive at the receiver 10 ahead of the anticipated schedule as determined prior to the assumed displacement, and the outputs of the pattern generators 20, 26 are advanced accordingly. The separation between these two outputs is fixed in accordance with the overall frame timing scheme of the system.

The previously transmitted "own-station" synchronizing burst arrives at the correlation detector 14 ahead of the output of the transmit pattern generator 26. Accordingly, the detector 14 develops an error signal, in response to which the transmit phasing servo 28 operates the phase shifter 32 to vary the phase of the oscillator input to the counter 34 such that the oscillator input to the counter appears as a lower frequency input. Therefore, the output of the counter is correspondingly delayed, and the transmit timing matrix 36 pulses the transmit pattern generator 38 to delay the next succeeding "own-station" synchronizing burst so that it arrives at the correlation detector 14 in time coincidence with the output of the transmit pattern generator 26, whereupon the error signal from the detector 14 falls to zero.

Such changes are substantially continuous, and to this end the frame intervals preferably are sufficiently short that transmissions of the frame and "own-station" synchronizing bursts are so closely spaced as to cause advancing or retarding of data transmissions to follow minute changes in relative position of the repeater. For this purpose, the shorter the frame intervals, the better. For example, transmissions may be of the order of several million bits per second, with respective master and "own-station" synchronizing bursts being transmitted several hundred or several thousand times per second.

The message signal (data) transmissions from a station are controlled by the output of the transmit timing matrix 36. In FIG. 1, there is shown an encode timing network 52 to which message signals are applied, and to which the matrix 36 is coupled. In synchronous relation with the "own-station" synchronizing bursts from the generator 38 controlled by the matrix 36, the network 52 operates at predetermined spaced intervals to permit message signals to be modulated onto the transmitter carrier.

These intervals, of course, are chosen to correspond to the time slots in which the stations data transmissions are to arrive at the repeater. At the station, the delay between the "own-station" synchronizing burst and the next succeeding data transmission is fixed for that station. Similarly, the delay between successive data transmissions of the station is fixed for that station. Thus, the data transmissions of each station are advanced or retarded the same as its "own-station" synchronizing bursts.

The encode timing network 52 may employ any suitable means for effecting data transmissions during the desired intervals. For example, digital timing may be employed derived directly from the transmit timing matrix 36 to (a) effect a data transmission a predetermined interval following the synchronizing burst, and (b) effect data transmissions at spaced intervals thereafter. Accordingly, each such synchronizing burst marks the beginning of a new frame for the station's data transmissions.

Figure 5:
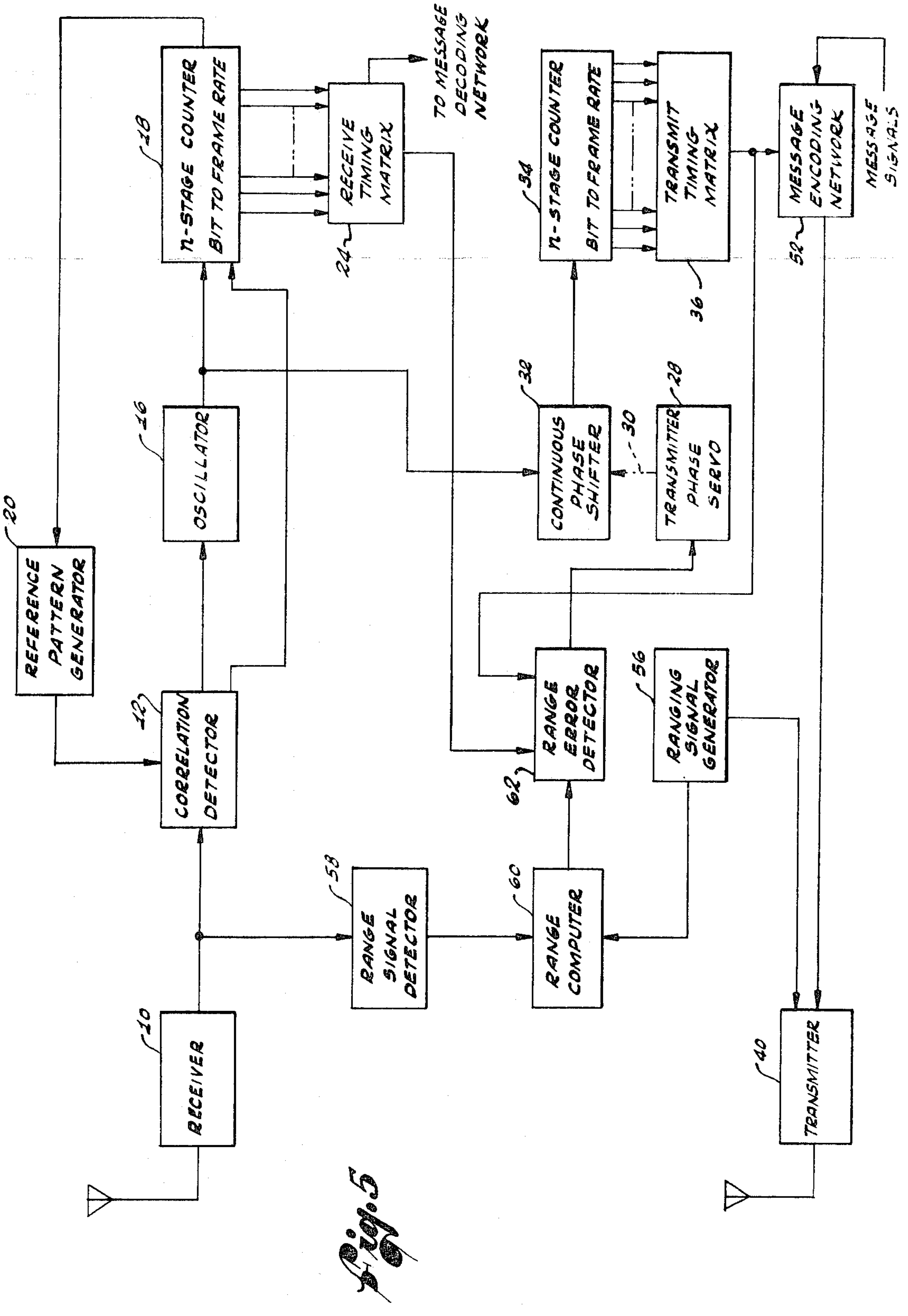
FIG. 5 is a block diagram of a modification of a portion of the system of FIG. 1, showing different means for effecting timing of the transmissions in accordance with relative movements of the repeater.

FIG. 5 illustrates an arrangement of the system of the invention for developing and utilizing range data for advancing or retarding the transmissions of "own-station" synchronizing bursts, and hence data transmissions. In this connection, a ranging signal generator 56 is adapted to modulate the transmitter 40 for the purpose of transmitting ranging signals to the repeater. As with other signals, the repeater is adapted to retransmit such ranging signals.

Such retransmitted ranging signals appear in the output of the receiver 10, and are detected by a range signal detector 58. Both the ranging signal generator 56 and the range signal detector 58 are coupled to a range computer 60, the output of which is connected to a range error detector 62. The range error detector 62 is coupled to the transmitter phase servo 28, so that signals from the range error detector 62 operate the servo 28 to control the phase shifter 32. As shown, the range error detector 62 has a pair of inputs to which the receive timing matrix 24 and the transmit timing matrix 36 are connected. The function of the range error detector is to compare the range as obtained from the range computer with the range represented by the difference in time of arrival of signals from the matrices 24 and 36.

Inasmuch as ranging signals are continuously transmitted to the repeater, e.g., by repetitive pulses or continuous wave train, and retransmitted from the repeater to the receiver 10, the range computer 60, via the range signal detector 58, is able to register a continuing check on the roundtrip delay of signals generated by the ranging signal generator 56 transmitted from the transmitter 40, and retransmitted by the repeater. Should the times of arrival of the retransmitted ranging signals vary—as will occur upon movement of the repeater toward or away from the station—the computer 60 develops an output that follows such variations.

The range error detector 62 responds to the outputs of the receive timing matrix 24, and the transmit timing matrix 36 to obtain a value of previously estimated range. This value compares with the output of the computer 60 to develop an error signal. Such error signal, as in the case of the error signal from the correlation detector 14 of FIG. 1, operates the transmitter phase servo 28, and hence, the continuous phase shifter 32, to change the phase of the oscillator output applied to the counter 34. Also as in the case of the system of FIG. 1, the output of the transmit timing matrix 36, corrects the estimated range in the range error detector 62 to the extent required to prevent further phase shifting of the oscillator input to the counter 34, i.e., to reduce the error signal from the range error detector 62 to zero.

In this latter connection, it can be shown that the differences between the outputs of the receive timing matrix 24 and the transmit timing matrix 36 correspond to range between the station and the repeater. Assuming the repeater and the stations to be stationary, the computer 60 would not detect any change in times of arrival of the retransmitted ranging signals.

As previously described, if the repeater moves closer to the station, the output of the reference pattern generator 20 is advanced. Correspondingly, the pulse output of the receive timing matrix 24 is advanced.

Also, as previously explained, this situation calls for the "own-station" synchronizing bursts from the transmit pattern generator 38 to be retarded, i.e., to delay transmissions so that they arrive at the repeater in the proper time slots. Therefore, the pulse output of the transmit timing matrix 36 must be retarded.

At the instant of advancement of the pulse output from the receive timing matrix 24, the computer 60 detects the change in times of arrival of the ranging signals and applies to the range error detector 62 a signal corresponding to such change. The range error detector 62 thereupon develops an error signal, causing the transmitter phase servo 28 to operate the phase shifter 32 for the purpose previously described. Accordingly, the pulse output of the transmit timing matrix 36 is delayed in time. Such delay is effected as is required to cause the computer 60 to register no further change in times of arrival of the ranging signals, and thereby reduce the error signal to zero.

In the case of a continuously moving repeater, of course, the computer 60 develops a continuing output corresponding to the continuing changes in times of arrival of ranging signals. Accordingly, the advancing or retarding of the outputs of the receive timing matrix 24 and transmit timing matrix 36 continuously change to follow the changes in range between the station and the repeater. Correspondingly, the data transmissions from the station are caused to be advanced or delayed as necessary to arrive at the receiver in the proper time slots.

It will now be apparent that the frame synchronizing bursts from the repeater may not be equally spaced, e.g., as where equally spaced frame synchronizing bursts are sent to the repeater from a remote station, but movement of the repeater causes such bursts to arrive at and be transmitted by the repeater with varying intervals between them. Similarly, the repeater may be arranged to transmit such bursts originating thereat with varying spacings. Either way, each station still responds to the frame synchronizing bursts and advances or retards its own transmissions as previously described.

From the foregoing, it will be apparent that various modifications can be made in the arrangements of the systems herein illustrated and described without departing from the spirit and scope of the invention. Accordingly, it is not intended that the invention be limited, except as by the appended claims.

What is claimed is:

1. In a time division multiplex communication system having a plurality of stations served by a common repeater which transmits repeater synchronizing signals identifiable therewith, wherein the stations are to transmit such that their message transmissions arrive at the repeater in a preselected order and with no overlap, and wherein relative motion between the repeater and the stations can occur, each station comprising the combination of:

a first controllable signal generator for generating repeater reference signals identical to the repeater synchronizing signals transmitted from the repeater;

receiving means for receiving signals transmitted from the repeater, including the repeater synchronizing signals;

first comparison means coupled to the output of said first controllable signal generator and to the output of said receiving means for comparing the repeater synchronizing signals received from the repeater with said repeater reference signals and developing an error signal in response to differences in timing therebetween;

means for coupling said first comparison means to said first controllable signal generator to apply said error signal thereto to synchronize said repeater reference signals with the repeater synchronizing signals received from the repeater;

a second controllable signal generator coupled to the output of said first controllable signal generator and responsive to signals therefrom to generate station synchronizing signals identifiable therewith;

transmitter means coupled to said second controllable signal generator for transmitting said station synchronizing signals to the repeater;

a third signal generator coupled to said first controllable signal generator and responsive to signals developed thereby corresponding in time to the station's time slot for generating station reference signals identical to said station synchronizing signals;

second comparison means coupled to the output of said third signal generator and to the output of said receiving means for comparing said station synchronizing signal received from the repeater with said station reference signals and developing an error signal in response to differences in time therebetween; and means for coupling said second comparison means to said second controllable signal generator to apply said error signal thereto to synchronize said station synchronizing signals received from the repeater with said station reference signals.

2. In a time division multiplex communication system having a plurality of stations served by a common repeater which transmits repeater synchronizing signals identifiable therewith, wherein the stations are to transmit such that their message transmissions arrive at the repeater in a preselected order and with no overlap, and wherein relative motion between the repeater and the stations can occur, each station comprising the combination of:

a controllable oscillator;

first counter means coupled to the output of said oscillator for providing a first pulse at the frame rate and displaced in time by one frame period;

a first signal generator coupled to the output of said first counter means and responsive to said first pulse to generate repeater reference signals identical to the repeater synchronizing signals transmitted from the repeater;

receiving means for receiving signals transmitted from the repeater, including the repeater synchronizing signals;

first comparison means coupled to said first signal generator and to said receiving means for comparing the repeater synchronizing signals received from the repeater with said repeater reference signals and developing an error signal in response to differences in timing therebetween;

means for coupling said first comparison means to said controllable oscillator to apply said error signal thereto to synchronize said repeater reference signals with the repeater synchronizing signals received from the repeater;

second counter means for providing a pulse at the frame rate corresponding in time to the station's time slot;

controllable continuously variable phase shifter means coupling the output of said oscillator to said second counter means;

a second signal generator coupled to the output of said second counter means and responsive to said pulse to generate station synchronizing signals identifiable therewith;

transmitter means coupled to said second signal generator for transmitting said station synchronizing signals to the repeater;

a third signal generator coupled to said first counter means and responsive to a second pulse developed thereby corresponding in time to the station's time slot for generating station reference signals identical to said station synchronizing signals;

second comparison means coupled to said third signal generator and to said receiving means for comparing said station synchronizing signal received from the repeater with said station reference signals and developing an error signal in response to differences in time therebetween; and means for coupling said second comparison means to said controllable phase shifter means to apply said error signal thereto to synchronize said station synchronizing signals received from the repeater with said station reference signals.

3. In a time division multiplex communication system having a plurality of stations served by a common repeater which transmits repeater synchronizing signals identifiable therewith, wherein the stations are to transmit such that their message transmissions arrive at the repeater in a preselected order and with no overlap, and wherein relative motion between the repeater and the stations can occur, each station comprising the combination of:

a controllable signal generator for generating repeater reference signals identical to the repeater synchronizing signals transmitted from the repeater;

receiving means for receiving signals transmitted from the repeater, including the repeater synchronizing signals;

first comparison means coupled to the output of said controllable signal generator and to the output of said receiving means for comparing the repeater synchronizing signals received from the repeater with said repeater reference signals and developing an error signal in response to differences in timing therebetween;

means for coupling said first comparison means to said controllable signal generator to apply said error signal thereto to synchronize said repeater reference signals with the repeater synchronizing signals received from the repeater;

timing means for providing a pulse at the frame rate corresponding in time to the station's time slot;

controllable continuously variable phase shifter means coupling the output of said controllable signal generator to said timing means;

a ranging signal generator for generating ranging signals;

transmitter means coupled to said ranging signal generator for transmitting said ranging signals to the repeater;

range computer means coupled to said receiving means and to said ranging signal generator for developing a signal indicative of the range from the repeater to the station;

second comparison means coupled to said range computer means, said controllable signal generator and to said timing means for comparing the signal indicative of the range with the difference between signals from said controllable signal generator and said timing means and for developing an error signal in response to range differences therebetween;

means for coupling said second comparison means to said controllable phase shifter means to apply said error signal thereto to correct the time of occurrence of the pulse developed by said timing means; and message transmitting means coupled to said timing means and to said transmitting means and responsive to said pulse for transmitting messages during the station's time slot.

4. In a time division multiplex communication system having a plurality of stations served by a common repeater which transmits repeater synchronizing signals identifiable therewith wherein the stations are to transmit such that their message transmissions arrive at the repeater in a preselected order and with no overlap, and wherein relative motion between the repeater and the stations can occur, each station comprising the combination of:

a controllable oscillator;

first counter means coupled to the output of said oscillator for providing a first pulse at the frame rate and displaced in time by one frame period;

a signal generator coupled to the output of said first counter means and responsive to said first pulse to generate repeater reference signals identical to the repeater synchronizing signals transmitted from the repeater;

receiving means for receiving signals transmitted from the repeater, including the repeater synchronizing signals;

first comparison means coupled to said signal generator and to said means for comparing the repeater synchronizing signals received from the repeater with said repeater reference signals and developing an error signal in response to differences in timing therebetween;

means for coupling said first comparison means to said controllable oscillator to apply said error signal thereto to synchronize said repeater reference signals with the repeater synchronizing signals received from the repeater;

second counter means for providing a pulse at the frame rate corresponding in time to the station's time slot;

controllable continuously variable phase shifter means coupling the output of said oscillator to said second counter means;

a ranging signal generator for generating ranging signals;

transmitter means coupled to said ranging signal generator for transmitting said ranging signals to the repeater;

range computer means coupled to said receiving means and to said ranging signal generator for developing a signal indicative of the range from the repeater to the station;

second comparison means coupled to said range computer means and to said first and second counter means for comparing the signal indicative of the range with the difference between signals from said first and second counter means and for developing an error signal in response to range differences therebetween;

means for coupling said second comparison means to said controllable phase shifter means to apply said error signal thereto to correct the time of occurrence of the pulse developed by said second counter means; and message transmitting means coupled to said second counter means and to said transmitting means and responsive to said pulse for transmitting messages during the station's time slot.

* * * * *

PO-1050
(5/69)

UNITED STATES PATENT OFFICE
CERTIFICATE OF CORRECTION

Patent No. 3,639,838 Dated February 1, 1972

Inventor(s) Henry G. Kuhn, deceased, and Ross Corless Winterbottom

It is certified that error appears in the above-identified patent and that said Letters Patent are hereby corrected as shown below:

Col. 9, line 20, after "said" insert --receiving--.

Signed and sealed this 11th day of July 1972.

(SEAL)
Attest:

EDWARD M. FLETCHER, JR.
Attesting Officer

ROBERT GOTTSCHALK
Commissioner of Patents